(12) United States Patent
Chasse, Jr. et al.

(10) Patent No.: US 10,132,244 B2
(45) Date of Patent: Nov. 20, 2018

(54) FUEL MANIFOLD FOR A GAS TURBINE ENGINE

(71) Applicant: United Technologies Corporation, Hartford, CT (US)

(72) Inventors: James P. Chasse, Jr., Wethersfield, CT (US); Peter Tu, Rocky Hill, CT (US); Robert F. Sheil, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 277 days.

(21) Appl. No.: 14/911,357

(22) PCT Filed: Aug. 29, 2014

(86) PCT No.: PCT/US2014/053526
§ 371 (c)(1),
(2) Date: Feb. 10, 2016

(87) PCT Pub. No.: WO2015/031823
PCT Pub. Date: Mar. 5, 2015

(65) Prior Publication Data
US 2016/0201562 A1    Jul. 14, 2016

Related U.S. Application Data

(60) Provisional application No. 61/872,378, filed on Aug. 30, 2013.

(51) Int. Cl.
*F02C 7/22* (2006.01)
*F02C 7/228* (2006.01)
(Continued)

(52) U.S. Cl.
CPC ............. *F02C 7/222* (2013.01); *F02C 7/22* (2013.01); *F02C 7/228* (2013.01); *F23K 5/06* (2013.01);
(Continued)

(58) Field of Classification Search
CPC .. F02C 7/222; F02C 7/22; F02C 7/228; F23K 5/06; F23K 2301/20; F23R 3/28
See application file for complete search history.

(56) References Cited

U.S. PATENT DOCUMENTS 3,793,838 A    2/1974  Nash
4,467,610 A    8/1984  Pearson et al.
(Continued)

FOREIGN PATENT DOCUMENTS

| GB | 723110 A | 2/1955 |
| GB | 878928 A | 10/1961 |
| JP | 2013133781 | 7/2013 |

OTHER PUBLICATIONS

EP search report for EP14840553.3 dated Aug. 17, 2016.

*Primary Examiner* — Steven Sutherland
(74) *Attorney, Agent, or Firm* — O'Shea Getz P.C.

(57) ABSTRACT

A fuel supply manifold for a gas turbine engine includes a first manifold segment includes a first multiple of double-barrel fittings in communication with a primary fuel circuit and a secondary fuel circuit. A second manifold segment includes a second multiple of double-barrel fittings in communication with the primary fuel circuit and the secondary fuel circuit. The first manifold segment is connected to the second manifold segment.

20 Claims, 13 Drawing Sheets

(51) Int. Cl.
*F23K 5/06* (2006.01)
*F23R 3/28* (2006.01)

(52) U.S. Cl.
CPC ............ *F23R 3/28* (2013.01); *F05D 2220/32* (2013.01); *F05D 2240/40* (2013.01); *F23K 2301/20* (2013.01)

(56) References Cited

U.S. PATENT DOCUMENTS

| | | | |
|---|---|---|---|
| 4,862,693 A * | 9/1989 | Batakis | F02C 7/222 |
| | | | 239/145 |
| 5,031,407 A | 7/1991 | Zaremba et al. | |
| 5,263,314 A | 11/1993 | Anderson | |
| 5,390,498 A | 2/1995 | Sulkin | |
| 8,037,690 B2 | 10/2011 | Morenko et al. | |
| 8,047,005 B2 | 11/2011 | Alexander et al. | |
| 8,051,664 B2 | 11/2011 | Fish | |
| 8,079,220 B2 | 12/2011 | Haggerty | |
| 8,123,406 B2 | 2/2012 | Erickson et al. | |
| 8,171,738 B2 | 5/2012 | Fish et al. | |
| 8,171,739 B2 | 5/2012 | Fish | |
| 8,234,871 B2 | 8/2012 | Davis, Jr. et al. | |
| 8,234,873 B2 | 8/2012 | Houtman et al. | |
| 8,353,166 B2 | 1/2013 | Morenko | |
| 8,375,696 B2 | 2/2013 | Lawson et al. | |
| 8,387,358 B2 | 3/2013 | Danis et al. | |
| 8,393,154 B2 | 3/2013 | Gandza | |
| 8,418,468 B2 | 4/2013 | McMahan et al. | |
| 8,438,830 B2 | 5/2013 | Lawson et al. | |
| 8,438,852 B2 | 5/2013 | Valeev et al. | |
| 2010/0005064 A1 | 3/2010 | Haggerty | |
| 2010/0146928 A1 | 6/2010 | Morenko et al. | |
| 2012/0145273 A1 | 6/2012 | Pelletier et al. | |
| 2013/0152590 A1* | 6/2013 | Kojovic | F23R 3/20 |
| | | | 60/739 |

* cited by examiner

FUEL MANIFOLD FOR A GAS TURBINE ENGINE

CROSS-REFERENCE TO RELATED APPLICATION

This application claims priority to PCT Patent Application No. PCT/US2014/053526 filed Aug. 29, 2014, which claims priority to U.S. Patent Application No. 61/872,378 filed Aug. 30, 2013, which are hereby incorporated by reference in their entireties.

BACKGROUND

The present disclosure relates to a gas turbine engine and, more particularly, to a fuel manifold therefor.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

A fuel supply system is mounted around the combustor section and generally includes a multiple of circumferentially distributed fuel injectors that axially project into a combustion chamber to supply fuel thereto. The multiple of circumferentially distributed fuel injectors are connected to multiple fuel supply manifolds that deliver fuel to the fuel injectors. There is typically one fuel supply manifold for each stage, thus, each fuel injector may have multiple fuel supply connections from multiple fuel supply manifolds.

The fuel supply system is a relatively complex assembly of formed tubes which are sequentially cut, measured, assembled, then welded to fit around the combustor section from fuel injector to fuel injector for that particular fuel injector distribution. Other configurations are manufactured in multiple segments for each of primary and secondary manifolds which may complicate assembly to the combustor section. Although effective, fuel supply systems are relatively complicated to manufacture and heavy in weight.

SUMMARY

A fuel supply manifold assembly for a gas turbine engine, according to one disclosed non-limiting embodiment of the present disclosure, includes a first manifold segment and a second manifold segment. The first manifold segment includes a first multiple of double-barrel fittings which at least partially defines a primary fuel circuit and a secondary fuel circuit. The second manifold segment is attachable to the first manifold segment. The second manifold segment includes a second multiple of double-barrel fittings that at least partially define the primary fuel circuit and the secondary fuel circuit.

In a further embodiment of the present disclosure, the first manifold segment and the second manifold segment are each of about 180 degrees.

In a further embodiment of any of the foregoing embodiments of the present disclosure, the primary fuel circuit and the secondary fuel circuit are at least partially defined by a multiple of straight tubes.

In a further embodiment of any of the foregoing embodiments of the present disclosure, the multiple of straight tubes are brazed between each two of the first multiple of double-barrel fittings and each two of the second multiple of double-barrel fittings.

In a further embodiment of any of the foregoing embodiments of the present disclosure, the primary fuel circuit is at least partially defined by a multiple of first straight tubes and the secondary fuel circuit is at least partially defined by a multiple of second straight tubes. The first straight tubes are larger in diameter than the second straight tubes.

In a further embodiment of any of the foregoing embodiments of the present disclosure, the first manifold segment includes a fuel manifold feed subassembly in communication with the primary fuel circuit and the secondary fuel circuit.

In a further embodiment of any of the foregoing embodiments of the present disclosure, the fuel manifold feed subassembly is located at bottom dead center of the gas turbine engine.

In a further embodiment of any of the foregoing embodiments of the present disclosure, each of the first and the second multiple of double-barrel fittings further includes: a first primary fuel circuit port of a primary fuel circuit that defines a first primary axis; and a second primary fuel circuit port of the primary fuel circuit in communication with the first primary fuel circuit port. The second primary fuel circuit port defines a second primary axis that defines an angle with respect to the first primary axis.

In a further embodiment of any of the foregoing embodiments of the present disclosure, the angle is about one hundred sixty (160) degrees A fuel supply manifold for a gas turbine engine, according to another disclosed non-limiting embodiment of the present disclosure, includes a first manifold segment and a second manifold segment. The first manifold segment includes a primary fuel circuit and a secondary fuel circuit each at least partially formed of a first multiple of straight tubes. The second manifold segment includes a primary fuel circuit and a secondary fuel circuit each at least partially formed of a second multiple of straight tubes. The first manifold segment attachable to the second manifold segment.

In a further embodiment of any of the foregoing embodiments of the present disclosure, the first manifold segment includes a first multiple of double-barrel fittings that interconnect the multiple of straight tubes. Each of the first multiple of double-barrel fittings further includes a first primary fuel circuit port of a primary fuel circuit that defines a first primary axis and a second primary fuel circuit port of the primary fuel circuit in communication with the first primary fuel circuit port. The second primary fuel circuit port defines a second primary axis that defines an angle with respect to the first primary axis.

In a further embodiment of any of the foregoing embodiments of the present disclosure, the second manifold segment includes a second multiple of double-barrel fittings that interconnect the multiple of straight tubes. Each of the second multiple of double-barrel fittings further includes a first primary fuel circuit port of a primary fuel circuit that defines a first primary axis and a second primary fuel circuit port of the primary fuel circuit in communication with the first primary fuel circuit port. The second primary fuel circuit port defines a second primary axis that defines an angle with respect to the first primary axis.

In a further embodiment of any of the foregoing embodiments of the present disclosure, each of the first and the second multiples of double-barrel fittings further includes a primary pigtail port in communication with the primary fuel circuit and a secondary pigtail port in communication with the secondary fuel circuit.

In a further embodiment of any of the foregoing embodiments of the present disclosure, the angle is about one hundred sixty (160) degrees.

In a further embodiment of any of the foregoing embodiments of the present disclosure, the first manifold segment includes a fuel manifold feed subassembly in communication with the primary fuel circuit and the secondary fuel circuit. The fuel manifold feed subassembly is located at bottom dead center of the gas turbine engine.

In a further embodiment of any of the foregoing embodiments of the present disclosure, the primary and the secondary pigtail port each includes a threaded interface.

In a further embodiment of any of the foregoing embodiments of the present disclosure, the fuel manifold feed subassembly is located at bottom dead center of the gas turbine engine.

A method of manufacturing a fuel supply manifold assembly for a gas turbine engine, according to another disclosed non-limiting embodiment of the present disclosure, includes assembling a multiple of double-barrel fittings with straight tubes therebetween as a manifold segment; and brazing the manifold segment.

In a further embodiment of any of the foregoing embodiments of the present disclosure, the manifold segment defines an arc of about 180 degrees.

In a further embodiment of any of the foregoing embodiments of the present disclosure, the method includes assembling includes assembling a bracket to at least one of the multiple of double-barrel fittings.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
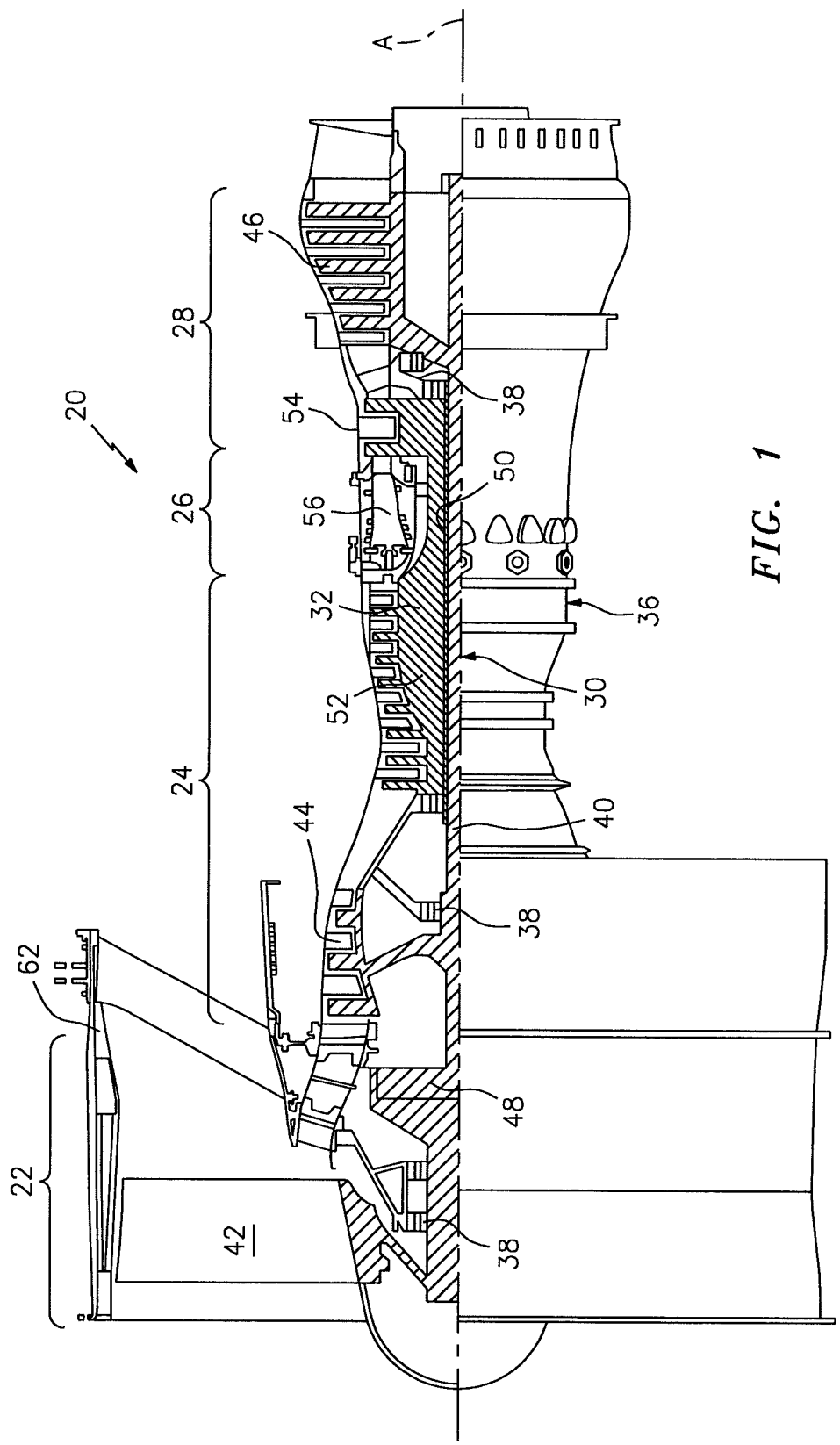
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air into the compressor section 24 and along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, for example, but not limited to, a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded through the HPT 54 and LPT 46. The LPT 46 and HPT 54 rotationally drive the respective low spool 30 and high spool 32 in response to the expansion.

Figure 2:
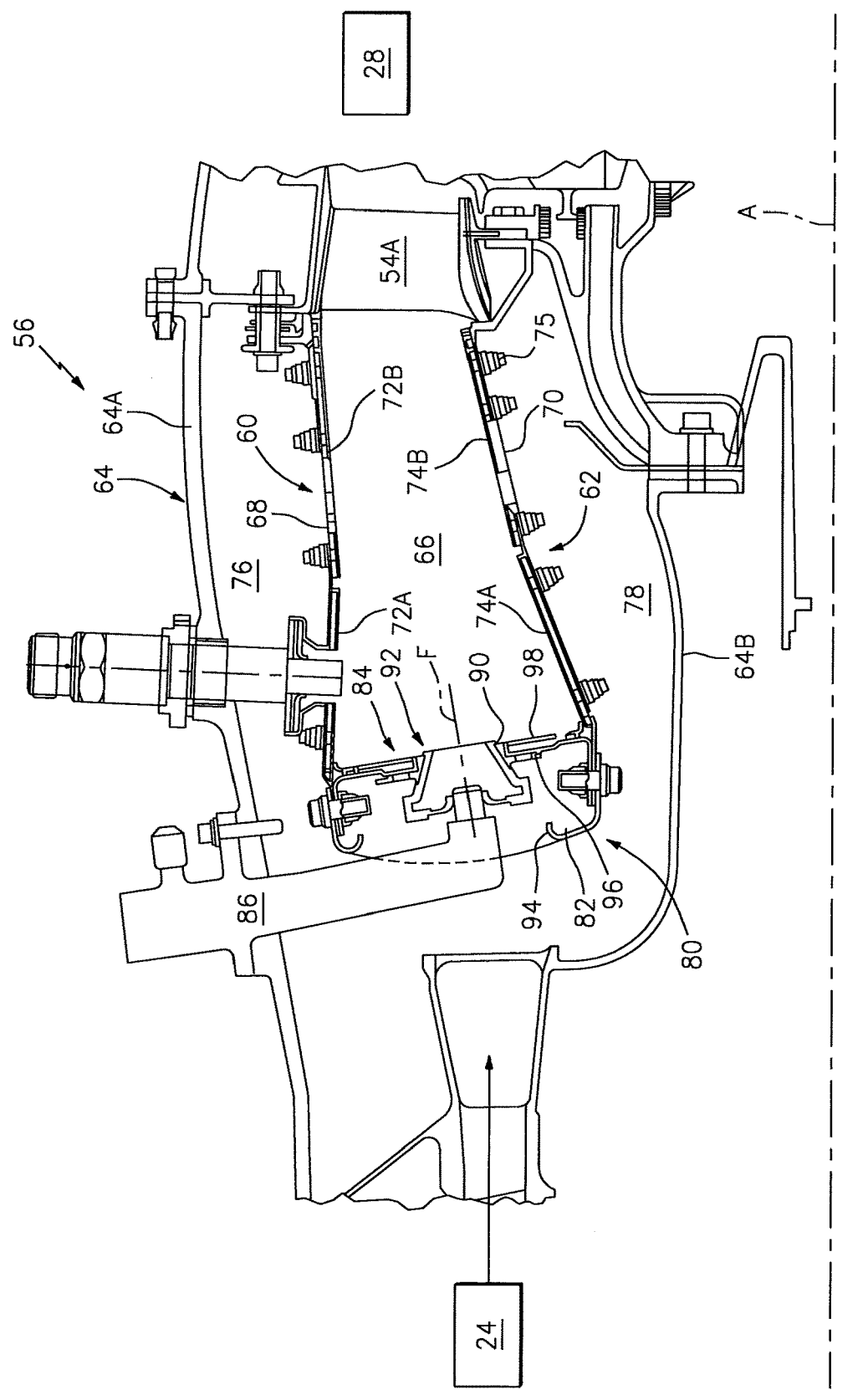
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer liner 60, an inner liner 62 and a diffuser case module 64. The outer liner 60 and the inner liner 62 are spaced apart such that a combustion chamber 66 is defined therebetween. The combustion chamber 66 is generally annular in shape. The outer liner 60 is spaced radially inward from an outer diffuser case 64A of the diffuser case module 64 to define an annular outer plenum 76. The inner liner 62 is spaced radially outward from an inner diffuser case 64B of the diffuser case module 64 to define an annular inner plenum 78. It should be understood that although a particular combustor is illustrated, other combustor types with various combustor liner arrangements will also benefit herefrom.

The liners 60, 62 contain the combustion products for direction toward the turbine section 28. Each liner 60, 62 generally includes a respective support shell 68, 70 which supports a multiple of heat shields 72, 74 which are attached to a hot side of the respective support shell 68, 70 with fasteners such as studs and nuts.

The combustor 56 also includes a forward assembly 80 immediately downstream of the compressor section 24 to guide compressed airflow C therefrom. The forward assembly 80 generally includes an annular hood 82, a bulkhead assembly 84 and a multiple of swirlers 90 (one shown).

The annular hood 82 extends radially between, and in this disclosed non-limiting embodiment, is secured to, the forwardmost ends of the liners 60, 62. The multiple of circumferentially distributed hood ports 94 accommodate a respective multiple of fuel injectors 86 as well as direct compressed air into the forward end of the combustion chamber 66 through the associated swirler 90. Each fuel injector 86 may be secured to the diffuser case module 64 to project through one of the hood ports 94 and the respective swirler 90. It should be appreciated that various architectures of the forward assembly 80 will also benefit herefrom.

Each swirler 90 in this disclosed non-limiting embodiment is circumferentially aligned with its respective hood port 94 to project through the bulkhead assembly 84. The bulkhead assembly 84 includes a bulkhead support shell 96 secured to the liners 60, 62, and a multiple of circumferentially distributed bulkhead heat shields 98 secured to the bulkhead support shell 96 around each swirler 90.

The forward assembly 80 and liners 60, 62 introduce core combustion air into the forward end of the combustion chamber 66 while the remainder enters the annular outer plenum 76 and the annular inner plenum 78. The multiple of fuel injectors 86 and swirlers 90 facilitate the generation of a blended fuel-air mixture that supports combustion in the combustion chamber 66.

Opposite the forward assembly 80, the outer and inner support shells 68, 70 interface with a first row of Nozzle Guide Vanes (NGVs) 54A of the HPT 54 in this disclosed non-limiting embodiment. The NGVs 54A are located immediately downstream of the combustor 56 as the first static vane structure upstream of a first turbine rotor in the turbine section 28. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and typically provide a "spin" or a "swirl" in the direction of turbine rotor rotation. The turbine rotor blades absorb this energy to drive the turbine rotor.

Figure 3:
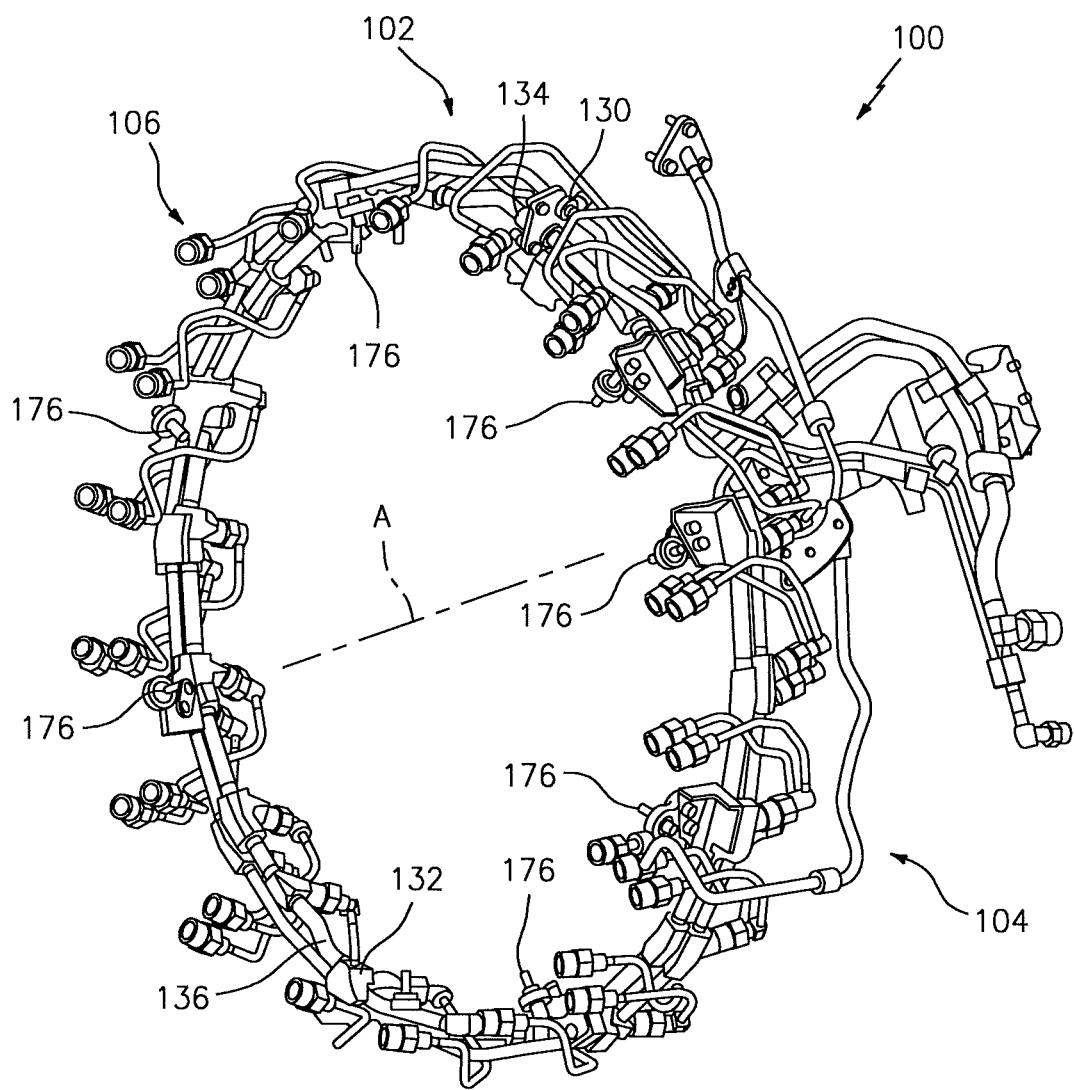
FIG. 3 is a perspective view of a fuel supply manifold.

With reference to FIG. 3, a fuel supply manifold assembly 100 generally includes at least one fuel supply manifold 102 to which the multiple of fuel injectors 86 are connected. The fuel supply manifold 102 is generally arranged circumferentially around the diffuser case module 64 to communicate fuel to the multiple of fuel injectors 86. It should be appreciated that various fuel injector systems and geometries will benefit herefrom.

Figure 4:
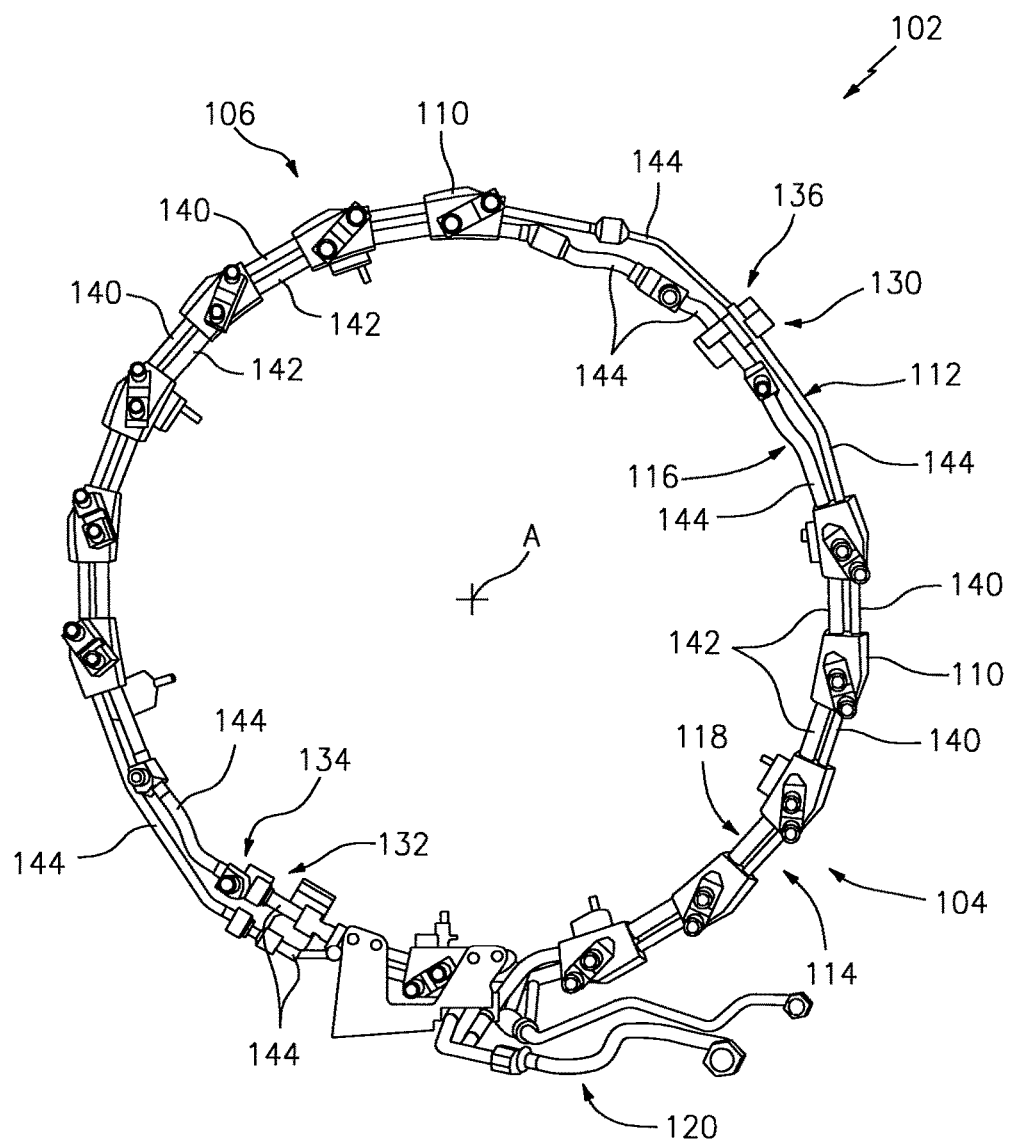
FIG. 4 is a front view of a fuel supply manifold.
Figure 5:
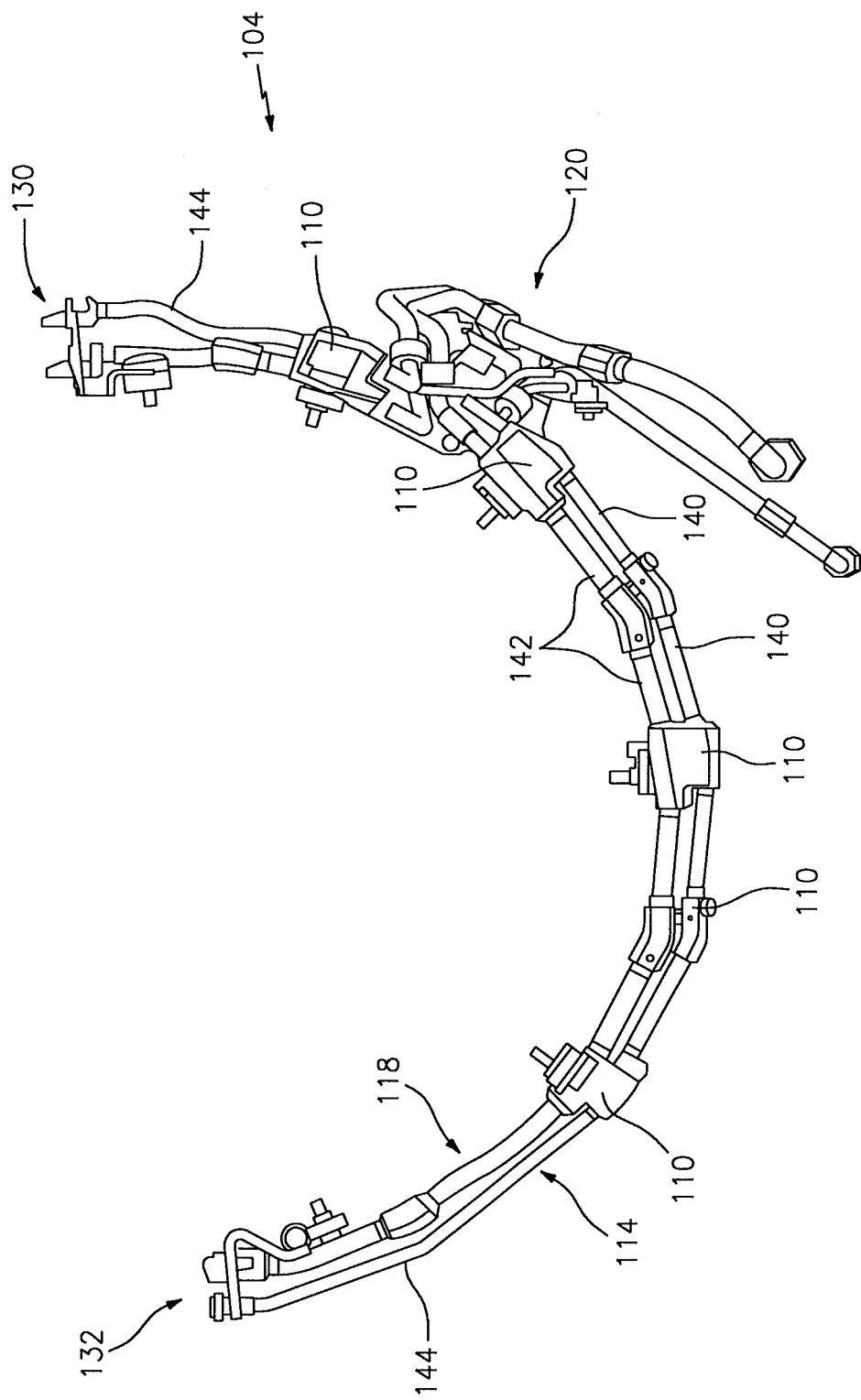
FIG. 5 is a front view of a first manifold segment of the fuel supply manifold.
Figure 6:
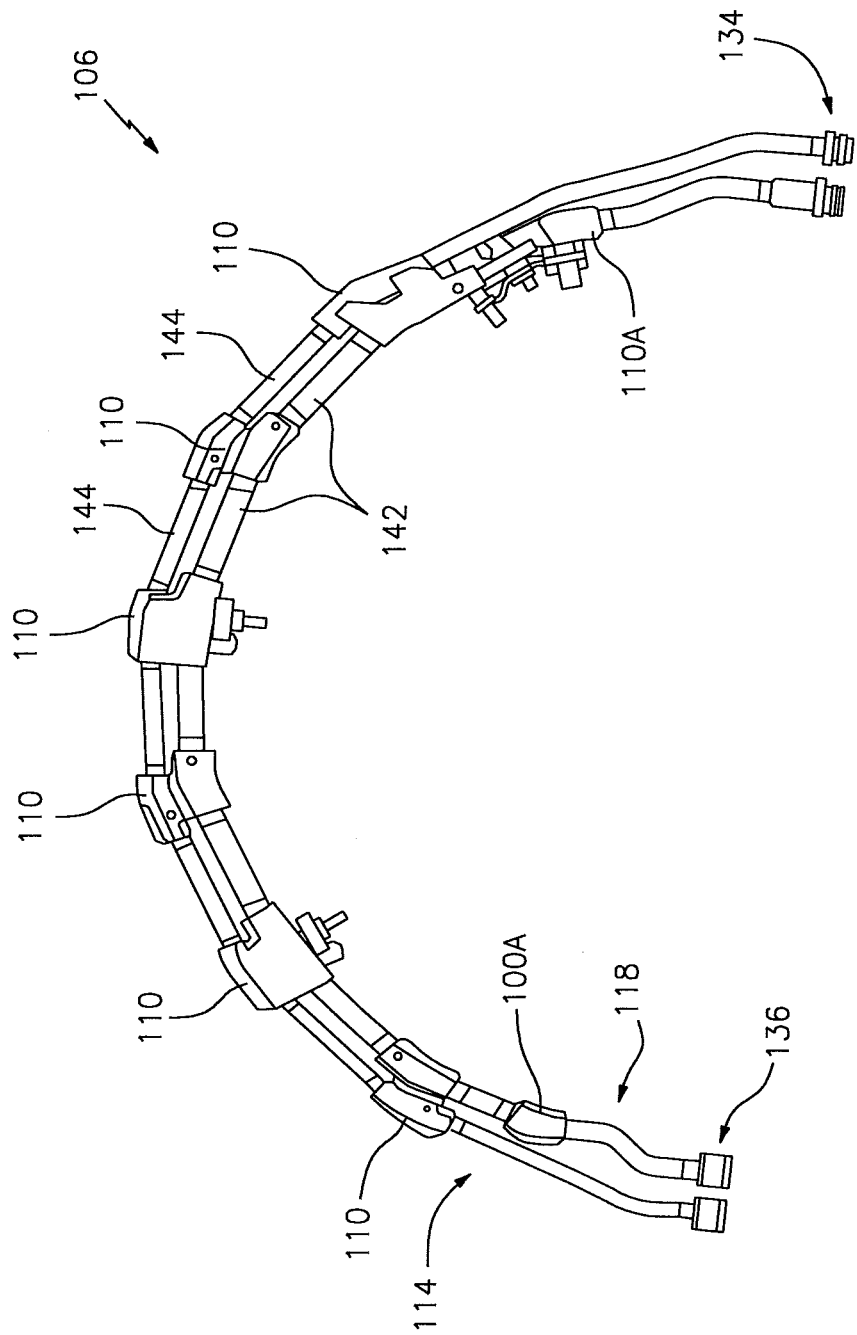
FIG. 6 is a front view of a second manifold segment of the fuel supply manifold.
Figure 7:
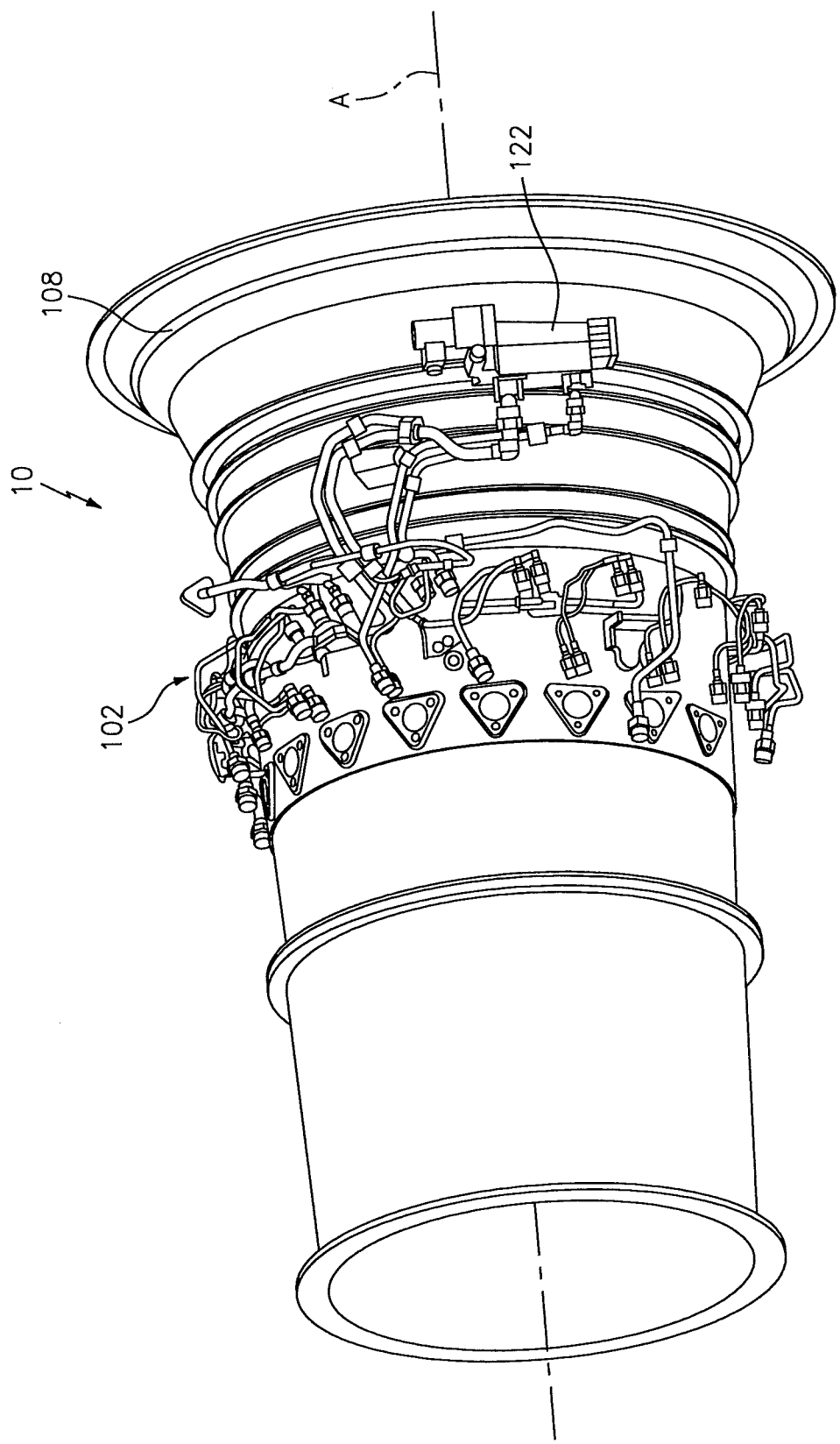
FIG. 7 is a perspective view of a fuel supply manifold mounted to a diffuser case.

With reference to FIG. 4, the fuel supply manifold 102 in the depicted embodiment generally includes a first manifold segment 104 (see also FIG. 5) and a second manifold segment 106 (see also FIG. 6) each of which define an arc of about 180 degrees to fit around a diffuser case 108 (illustrated schematically; FIG. 7) of the combustor section 24. Each manifold segment 104, 106 includes a multiple of double-barrel fittings 110 that support and connect a primary fuel circuit 112 with a multiple of primary fuel tubes 114 and a secondary fuel circuit 116 with a multiple of secondary fuel tubes 118. That is, the primary fuel flow through the multiple of primary fuel tubes 114 and the secondary fuel flow through the multiple of secondary fuel tubes 118 separately pass through the common double-barrel fittings 110. In one disclosed non-limiting embodiment, the multiple of primary fuel tubes 114 are relatively smaller than the multiple of secondary fuel tubes 118.

The first manifold segment 104 includes a fuel manifold feed subassembly 120 located at bottom dead center in the depicted embodiment. The fuel manifold feed subassembly 120 communicates fuel simultaneously into both manifold segments 104, 106 from, for example, a main fuel valve 122 (see FIG. 7). As the fuel manifold feed subassembly 120 communicates fuel simultaneously into both manifold segments 104, 106 and is located at bottom dead center, the fuel manifold feed subassembly 120 also permits complete fuel drain from both manifold segments 104, 106.

Figure 8:
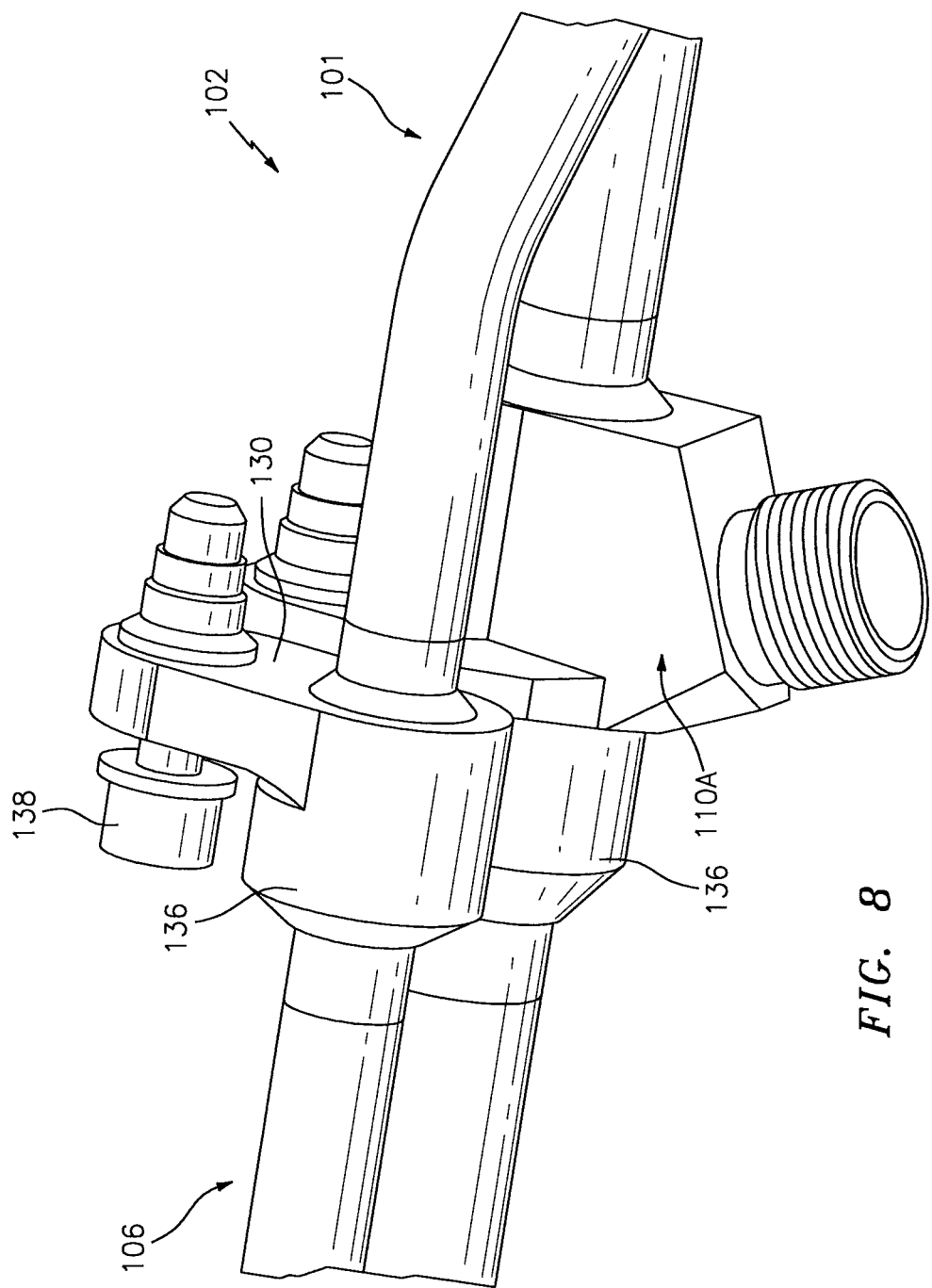
FIG. 8 is a perspective view of a fitting between the first manifold segment and the second manifold segment.

With continued reference to FIG. 4, the first manifold segment 104 includes a male end fitting 130 and a female end fitting 132 that connect with a corresponding male end fitting 134 and a female end fitting 136 on the second manifold segment 106. The end fittings 130-136 permit assembly and disassembly of the manifold segments 104, 106 via fasteners 138 (see FIG. 8) or other removable hardware. It should be appreciated that various removable fastener arrangements may be utilized to facilitate separation of the manifold segments 104, 106 for assembly and maintenance.

The multiple of primary fuel tubes 114 and the multiple of secondary fuel tubes 118 each respectively include a multiple of straight tubes 140, 142. The straight tubes 140, 142 interconnect two or more double-barrel fittings 110. Each double-barrel fitting 110 provide the angular interface between the straight tubes 140, 142 to circumferentially surround the diffuser case 108. That is, the double-barrel fitting 110 angles the multiple of straight tubes 140, 142 to form a ring formed of straight segments to minimize the number of bended tubes 144 which are typically at the distal ends of the manifold segments 104, 106. The double-barrel fittings 110 and multiple of straight tubes 140, 142 further facilitate brazed assembly.

Figure 9:
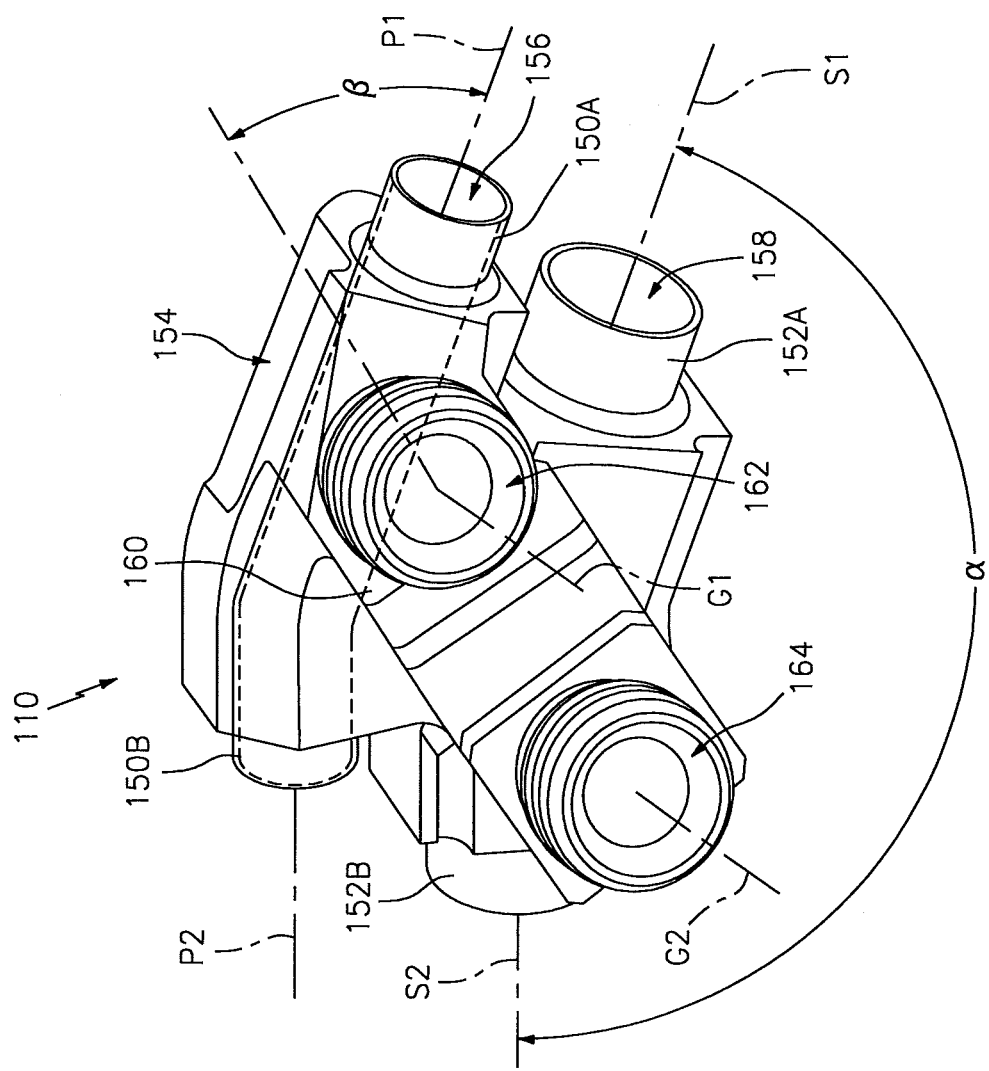
FIG. 9 is a front perspective view of a double-barrel fitting.

With reference to FIG. 9, each of the double-barrel fittings 110 is defined by a housing 154 with opposed primary fuel circuit ports 150A, 150B and opposed secondary circuit ports 152A, 152B. The opposed primary fuel circuit ports 150A, 150B receive respective straight tubes 140A, 140B and opposed secondary circuit ports 152A, 152B receive respective, straight tubes 142A, 142B (see FIGS. 4-6). A non-linear primary passage 156 interconnects the opposed primary fuel circuit ports 150A, 150B and a non-linear secondary passage 158 interconnects the opposed secondary circuit ports 152A, 152B. That is the double-barrel fitting 110 continues the separate primary fuel path between the primary fuel circuit ports 150A, 150B and the secondary fuel path between the opposed secondary circuit ports 152A, 152B yet arranges the associated straight tubes 140A, 140B, 142A, 142B into a ring of primarily straight segments.

Each of the double-barrel fittings 110 separately communicates the two fuel flows, i.e. primary and secondary, through the primary fuel circuit 112 and the secondary fuel circuit 116 as well as communicates fuel therefrom to the respective duplex fuel injector 86. That is, each of the double-barrel fitting 110 is associated with a respective fuel injector 86. It should be appreciated that single pass fittings 110A (FIG. 8) may also be provided in each of the first manifold segment 104 and the second manifold segment 106 to provide fuel to a simplex fuel injector.

The primary and secondary fuel circuit ports 150A, 150B, 152A, 152B may be either male (shown) or female to respectively interface with the straight tubes 140A, 140B, 142A, 142B. The straight tubes 140A, 140B, 142A, 142B are thereby fitted onto the ports 150A, 150B, 152A, 152B to readily provide for a brazed interface. Alternatively, the primary and secondary fuel circuit ports 150A, 150B, 152A, 152B may interface with the straight tubes 140A, 140B, 142A, 142B via welding, threaded couplings, or others.

The double-barrel fittings 110 each define an angle α between a first and second primary circuit axis P1, P2 defined by the opposed primary fuel circuit ports 150A, 150B as well as between first and second secondary circuit axis S1, S2 defined by the opposed secondary circuit ports 152A, 152B. The first and second primary fuel circuit axes P1, P2 are generally parallel to the respective first and second secondary fuel circuit axes S1, S2.

In one disclosed non-limiting embodiment, angle α is an about one hundred sixty (160) degree angular interface between straight tubes 140A, 140B of the primary fuel circuit 112 and straight tubes 142A, 142B of the secondary fuel circuit 116. For example, the second manifold segment 106 includes six (6) double-barrel fittings 110 which, at the one hundred sixty (160) degree angular interface, covers a straight segmented arc of about one hundred twenty (120) degrees with the remainder of the one hundred eighty (180) degree arc made up by the bended tubes 144 (see FIGS. 5 and 6). The fuel supply manifold 102 requires only two halves rather than the more conventional four which reduces part count. It should be appreciated that the other angular interfaces that accommodate other numbers of double-barrel fittings 110 will also benefit herefrom.

Each double-barrel fittings 110 also includes a pigtail interface 160. The pigtail interface 160 includes a primary pigtail port 162 in communication with the primary fuel circuit 112 and a secondary pigtail port 164 in communication with the secondary fuel circuit 116. The pigtail interface 160 extends transverse to the primary and secondary fuel circuit ports 150A, 150B, 152A, 152B and, in the disclosed non-limiting embodiment, may be angled at an angle β with respect to axes P1, P2, S1, S2 to facilitate packaging.

Figure 10:
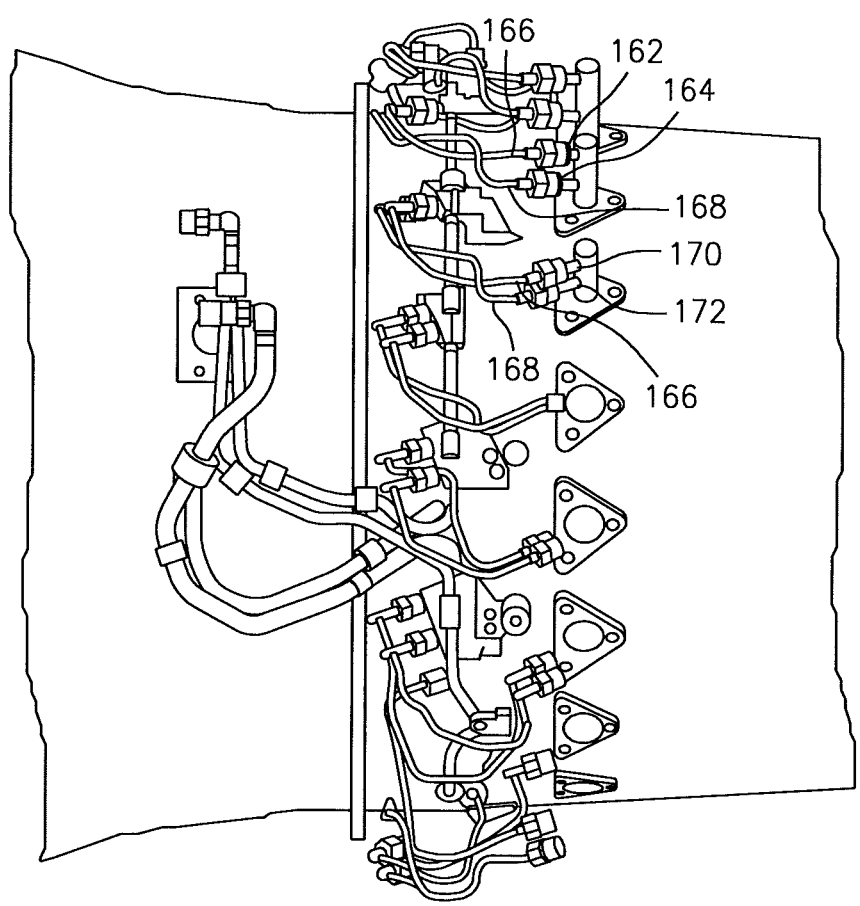
FIG. 10 is a perspective view of a pigtail between a double-barrel fitting and a duplex fuel injector.

The primary and the secondary pigtail ports 162, 164 define respective axes G1, G2 that extend transverse to a plane that contains axes P1, P2 and S1, S2 to receive a respective pigtails 166, 168 (see FIG. 10) to minimize complicated bends as well as to facilitate assembly and maintenance. The primary and the secondary pigtail port 162, 164 may be threaded to respectively receive the pigtail 166, 168 (see FIG. 10) that communicate fuel to the individual fuel injectors 86. The pigtails 166, 168 may include, for example, B-nuts that are thereby screwed into the respective primary and secondary port 162, 164 as well as the associated primary and secondary fuel injector port 170, 172 of the fuel injector 86 (see FIG. 10).

Figure 11:
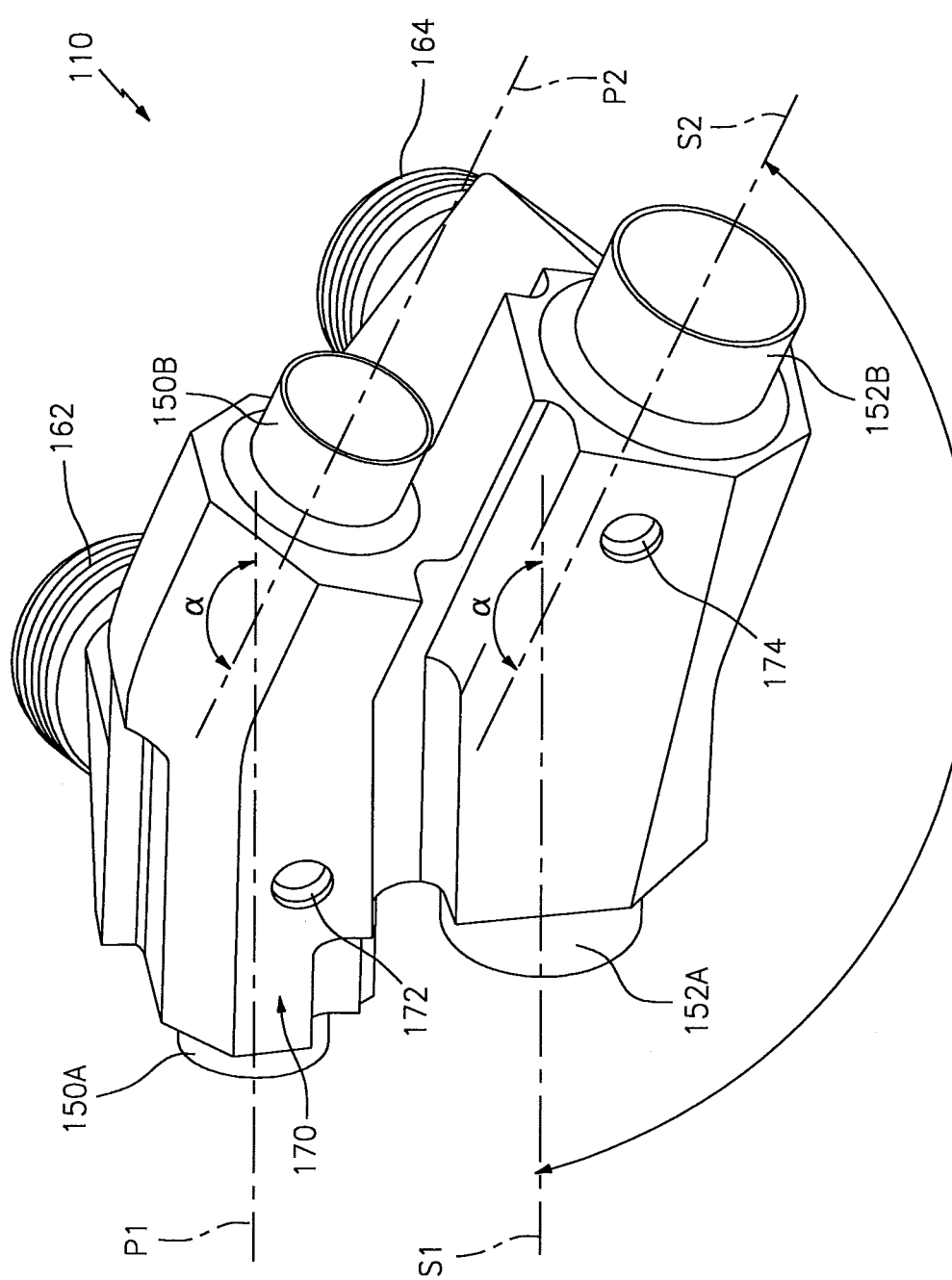
FIG. 11 is a rear perspective view of the double-barrel fitting of FIG. 10.
Figure 12:
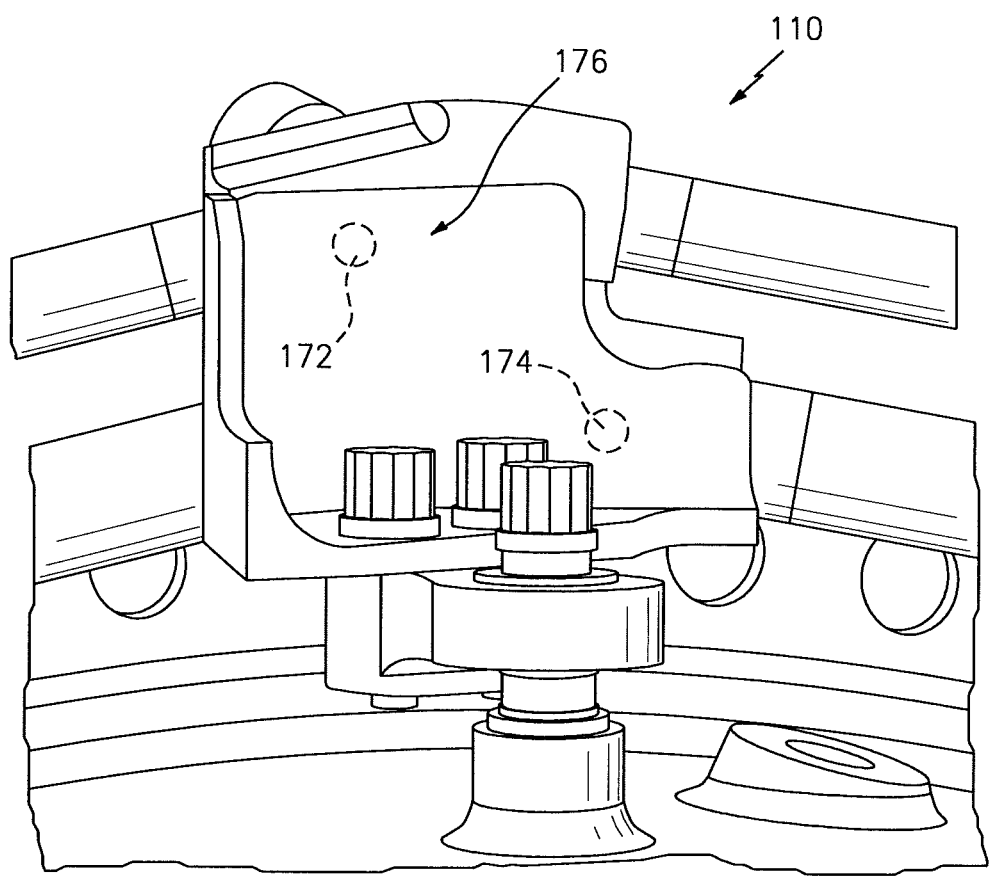
FIG. 12 is a rear perspective view of a double-barrel fitting with a bracket to mount the fuel manifold to a diffuser case according to one disclosed non-limiting embodiment.

With reference to FIG. 11, each of the double-barrel fittings 110 also includes a mount interface 170 opposite the pigtail interface 160 which, in the disclosed non-limiting embodiment, includes a first and second locating feature 172, 174. The locating feature 172, 174 readily permits a bracket 176 (see FIG. 12) or other mount to be brazed directly to desired specific double-barrel fitting 110. That is, all the double-barrel fittings 110 include the common mount interface 170 but only select double-barrel fittings 110 may include the bracket 176 to mount the fuel supply manifold 102. It should be appreciated that other mount structure may be utilized with the common mount interface 170 to accommodate various engine architectures and accessory equipment.

Figure 13:
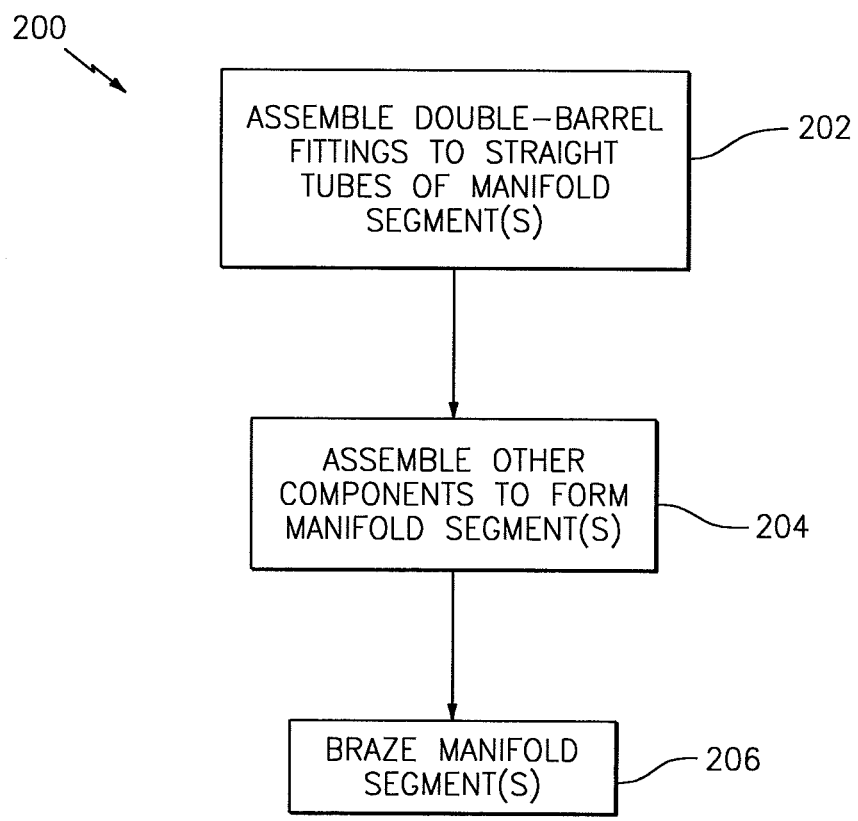
FIG. 13 is a block diagram of a method to manufacture a manifold segment.

With reference to FIG. 13, a method 200 to assemble the fuel supply manifold 102 initially includes assembling a multiple of double-barrel fittings 110 with straight tubes 140A, 140B, 142A, 142B therebetween (step 202). Other components such as the bended tubes 144, end fittings 130, 132, etc., are also assembled (step 204). The components of the first manifold segment 104 and/or the second manifold segment 106 may be located in a fixture or other build structure to facilitate precise assembly. The assembly is then brazed in a braze oven to form the manifold segments 104, 106 (step 206).

As the fuel supply manifold 102 is a brazed assembly, the fuel supply manifold 102 is relatively less complicated to assemble to the required tolerances. Brazing readily facilitates reduced manufacturing time because once everything is fixtured and located in the braze oven, the entire first manifold segment 104 and/or second manifold segment 106 are complete compared to a conventional design in which each joint is welded separately then the next tube segment is cut and bent as needed to meet the required tolerances. Cost is also decreased through the use of common fittings and straight tubes thereby increasing part commonality and reducing the number of unique part types required for an engine.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:
1. An assembly for a gas turbine engine, comprising:
 a first manifold segment including a first multiple of double-barrel fittings which at least partially defines a primary fuel circuit and a secondary fuel circuit;
 a second manifold segment attachable to the first manifold segment, the second manifold segment including a second multiple of double-barrel fittings that at least partially define the primary fuel circuit and the secondary fuel circuit;
 a first pigtail;
 a second pigtail;
 a third pigtail;
 a fourth pigtail;

a first fuel injector that includes a first primary fuel injector port and a first secondary fuel injector port; and
a second fuel injector that includes a second primary fuel injector port and a second secondary fuel injector port,
wherein a double-barrel fitting of the first multiple of double-barrel fittings includes a first primary pigtail port in communication with the primary feel circuit and a first secondary pigtail port in communication with the secondary fuel circuit,
wherein a double-barrel fitting of the second multiple of double barrel fittings includes a second primary pigtail port in communication with the primary fuel circuit and a second secondary pigtail port in communication with the secondary fuel circuit,
wherein the first pigtail is received by the first primary fuel injector port and the first primary pigtail port,
wherein the second pigtail is received by the first secondary fuel injector port and the first secondary pigtail port,
wherein the third pigtail is received by the second primary fuel injector port and the second primary pigtail port, and
wherein the fourth pigtail is received by the second secondary fuel injector port and the second secondary pigtail port.

2. The assembly as recited in claim 1, wherein the first manifold segment defines an arc of 180 degrees, and wherein the second manifold segment defines an arc of 180 degrees.

3. The assembly as recited in claim 1, wherein the primary fuel circuit is at least partially defined by a multiple of first straight tubes and the secondary fuel circuit is at least partially defined by a multiple of second straight tubes, wherein the multiple of first straight tubes are brazed between each two of the first multiple of double-barrel fittings, and wherein the multiple of second straight tubes are brazed between each two of the second multiple of double-barrel fittings.

4. The assembly as recited in claim 1, wherein the first manifold segment includes a fuel manifold feed subassembly in communication with the primary fuel circuit and the secondary fuel circuit.

5. The assembly as recited in claim 4, wherein the fuel manifold feed subassembly is located at bottom dead center of the gas turbine engine.

6. The assembly as recited in claim 1, wherein each of the first and second multiple of double-barrel fittings further comprises:
a first primary fuel circuit port of the primary fuel circuit that defines a first primary axis; and
a second primary fuel circuit port of the primary fuel circuit in communication with the first primary fuel circuit port, wherein the second primary fuel circuit port defines a second primary axis that defines an angle with respect to the first primary axis.

7. The assembly as recited in claim 6, wherein the angle is one hundred sixty (160) degrees.

8. The assembly as recited in claim 1,
wherein the first pigtail includes a first B-nut that is screwed into the first primary fuel injector port and a second B-nut that is screwed into the first primary pigtail port,
wherein the second pigtail includes a third B-nut that is screwed into the first secondary fuel injector port and a fourth B-nut that is screwed into the first secondary pigtail port,
wherein the third pigtail includes a fifth B-nut that is screwed into the second primary fuel injector port and a sixth B-nut that is screwed into the second primary pigtail port, and
wherein the fourth pigtail includes a seventh B-nut that is screwed into the second secondary fuel injector port and an eighth B-nut that is screwed into the second secondary pigtail port.

9. An assembly for a gas turbine engine, comprising:
a first manifold segment including a primary fuel circuit and a secondary fuel circuit each at least partially formed of a first multiple of straight tubes;
a second manifold segment including a primary fuel circuit and a secondary fuel circuit each at least partially formed of a second multiple of straight tubes, wherein the first manifold segment is attachable to the second manifold segment,
a first pigtail;
a second pigtail;
a third pigtail;
a fourth pigtail;
a first fuel injector that includes a first primary fuel injector port and a first secondary fuel injector port; and
a second fuel injector that includes a second primary fuel injector port and a second secondary fuel injector port,
wherein the first manifold segment includes a first multiple of double-barrel fittings that interconnect the first multiple of straight tubes,
wherein the second manifold segment includes a second multiple of double-barrel fittings that interconnect the second multiple of straight tubes,
wherein a double-barrel fitting of the first multiple of double-barrel fittings includes a first primary pigtail port in communication with the primary fuel circuit and a first secondary pigtail port in communication with the secondary fuel circuit,
wherein a double-barrel fitting of the second multiple of double barrel fittings includes a second primary pigtail port in communication with the primary fuel circuit and a second secondary pigtail port in communication with the secondary fuel circuit,
wherein the first pigtail is received by the first primary fuel injector port and the first primary pigtail port,
wherein the second pigtail is received by the first secondary fuel injector port and the first secondary pigtail port,
wherein the third pigtail is received by the second primary fuel injector port and the second primary pigtail port, and
wherein the fourth pigtail is received by the second secondary fuel injector port and the second secondary pigtail port.

10. The assembly as recited in claim 9, wherein each of the first multiple of double-barrel fittings further comprise:
a first primary fuel circuit port of the primary fuel circuit of the first manifold segment that defines a first primary axis; and
a second primary fuel circuit port of the primary fuel circuit of the first manifold segment in communication with the first primary fuel circuit port, wherein the second primary fuel circuit port defines a second primary axis that defines a first angle with respect to the first primary axis.

11. The assembly as recited in claim 10, wherein each of the second multiple of double-barrel fittings further comprise:

a first primary fuel circuit port of the primary fuel circuit of the second manifold segment that defines a third primary axis; and a second primary fuel circuit port of the primary fuel circuit of the second manifold segment in communication with the first primary fuel circuit port of the primary fuel circuit of the second manifold segment, wherein the second primary fuel circuit port of the primary fuel circuit of the second manifold segment defines a fourth primary axis that defines a second angle with respect to the third primary axis.

12. The assembly as recited in claim 10, wherein the first angle is one hundred sixty (160) degrees.

13. The assembly as recited in claim 9, wherein the first manifold segment includes a fuel manifold feed subassembly in communication with the primary fuel circuit and the secondary fuel circuit, and the fuel manifold feed subassembly is located at bottom dead center of the gas turbine engine.

14. The assembly as recited in claim 9, wherein the first primary pigtail port and the first secondary pigtail port each include a threaded interface.

15. The assembly as recited in claim 14, wherein the first manifold segment includes a fuel manifold feed subassembly in communication with the primary fuel circuit and the secondary fuel circuit, and wherein the fuel manifold feed subassembly is located at bottom dead center of the gas turbine engine.

16. The assembly as recited in claim 9,
wherein the first pigtail includes a first B-nut that is screwed into the first primary fuel injector port and a second B-nut that is screwed into the first primary pigtail port,
wherein the second pigtail includes a third B-nut that is screwed into the first secondary fuel injector port and a fourth B-nut that is screwed into the first secondary pigtail port,
wherein the third pigtail includes a fifth B-nut that is screwed into the second primary fuel injector port and a sixth B-nut that is screwed into the second primary pigtail port, and
wherein the fourth pigtail includes a seventh B-nut that is screwed into the second secondary fuel injector port and an eighth B-nut that is screwed into the second secondary pigtail port.

17. A method of manufacturing a fuel supply manifold assembly for a gas turbine engine, the method comprising:
assembling a multiple of double-barrel fittings with straight tubes therebetween as a manifold segment, wherein a double-barrel fitting of the multiple of double-barrel fittings includes a primary pigtail port in communication with a primary fuel circuit and a secondary pigtail port in communication with a secondary fuel circuit;
brazing the manifold segment, wherein the straight tubes include a multiple of first straight tubes associated with the primary fuel circuit and a multiple of second straight tubes associated with the secondary fuel circuit;
assembling a first pigtail such that the first pigtail is received by a primary fuel injector port of a fuel injector and the primary pigtail port; and
assembling a second pigtail such that the second pigtail is received by a secondary fuel injector port of the fuel injector and the secondary pigtail port.

18. The method as recited in claim 17, wherein the manifold segment defines an arc of 180 degrees.

19. The method as recited in claim 17, wherein assembling includes assembling a bracket to the double-barrel fitting.

20. The method as recited in claim 17,
wherein the first pigtail includes a first B-nut that is screwed into the primary fuel injector port and a second B-nut that is screwed into the primary pigtail port, and
wherein the second pigtail include a third B-nut that is screwed into the secondary fuel injector port and a fourth B-nut that is screwed into the secondary pigtail port.

* * * * *